United States Patent
Aritomi et al.

(10) Patent No.: US 12,384,454 B2
(45) Date of Patent: Aug. 12, 2025

(54) STEER-BY-WIRE CONTROL DEVICE AND STEER-BY-WIRE CONTROL METHOD

(71) Applicant: Hitachi Astemo, Ltd., Hitachinaka (JP)

(72) Inventors: Shunsuke Aritomi, Tokyo (JP); Tadaharu Yokota, Hitachinaka (JP); Yasuhito Nakakuki, Hitachinaka (JP); Atsushi Hirata, Hitachinaka (JP); Takahiro Ito, Tokyo (JP); Kenta Maeda, Tokyo (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 52 days.

(21) Appl. No.: 18/576,135

(22) PCT Filed: Jun. 1, 2022

(86) PCT No.: PCT/JP2022/022325
§ 371 (c)(1),
(2) Date: Jan. 3, 2024

(87) PCT Pub. No.: WO2023/281941
PCT Pub. Date: Jan. 12, 2023

(65) Prior Publication Data
US 2024/0308579 A1 Sep. 19, 2024

(30) Foreign Application Priority Data
Jul. 7, 2021 (JP) .................. 2021-112608

(51) Int. Cl.
*B62D 6/00* (2006.01)
*B60W 60/00* (2020.01)
(Continued)

(52) U.S. Cl.
CPC .......... *B62D 6/008* (2013.01); *B60W 60/005* (2020.02); *B60W 60/0061* (2020.02);
(Continued)

(58) Field of Classification Search
CPC ...... B62D 6/008; B62D 5/001; B62D 5/0409; B62D 5/0421; B62D 5/046;
(Continued)

(56) References Cited

U.S. PATENT DOCUMENTS

2007/0219691 A1 9/2007 Fukuba et al.
2017/0272009 A1* 9/2017 Kawamura ........... B60L 3/0046
(Continued)

FOREIGN PATENT DOCUMENTS

JP 2005-153648 A 6/2005
JP 2007-245904 A 9/2007
(Continued)

OTHER PUBLICATIONS

International Search Report, PCT/JP2022/022325, Aug. 23, 2022, 2 pgs.

*Primary Examiner* — Jacob M Amick
(74) *Attorney, Agent, or Firm* — Volpe Koenig

(57) ABSTRACT

A steer-by-wire control device according to the present invention includes a control device that controls a first motor that operates a steering wheel of a vehicle and a second motor that controls steering operation of a wheel. Before making a transition to an automatic driving mode of the vehicle, the control device applies input torque to the steering wheel by the first motor in a forward rotation direction and a backward rotation direction of rotation directions of the first motor, acquires behavior information of the steering wheel obtained by application of the input torque, and determines whether or not to estimate a control parameter of the steering wheel based on the behavior information. The behavior information includes at least one of a value of a rotation angle of a steering wheel and a value obtained by time-differentiating a rotation angle.

11 Claims, 7 Drawing Sheets

(51) Int. Cl.
 *B62D 5/00* (2006.01)
 *B62D 5/04* (2006.01)

(52) U.S. Cl.
 CPC ........... *B62D 5/001* (2013.01); *B62D 5/0409* (2013.01); *B62D 5/0421* (2013.01); *B62D 5/046* (2013.01)

(58) Field of Classification Search
 CPC .......... B60W 60/005; B60W 60/0051; B60W 60/0053; B60W 60/0059; B60W 60/0061; B60W 60/007
 See application file for complete search history.

(56) References Cited

U.S. PATENT DOCUMENTS

| | | |
|---|---|---|
| 2018/0154936 A1 | 6/2018 | Yamasaki et al. |
| 2020/0070872 A1 | 3/2020 | Ushiro et al. |
| 2021/0078604 A1* | 3/2021 | Namba ............ B60W 60/0059 |
| 2024/0083466 A1* | 3/2024 | Jang ................. B60W 60/0053 |
| 2024/0343293 A1* | 10/2024 | Kohári ................ B62D 15/025 |
| 2024/0367691 A1* | 11/2024 | Heinrich ................ B62D 1/181 |

FOREIGN PATENT DOCUMENTS

| | | |
|---|---|---|
| JP | 2017-007484 A | 1/2017 |
| JP | 2020-037315 A | 3/2020 |

\* cited by examiner

STEER-BY-WIRE CONTROL DEVICE AND STEER-BY-WIRE CONTROL METHOD

TECHNICAL FIELD

The present invention relates to a steer-by-wire control device that is a steering control device mounted on an automobile.

BACKGROUND ART

In a steering control device for an automobile (hereinafter, referred to as a "vehicle"), a steering control device of what is called a steer-by-wire system in which a steering shaft connected to a steering wheel is mechanically separated from a steering mechanism is known. A steer-by-wire control device, which is a steering control device of a steer-by-wire system, detects a rotation angle, a rotation direction, and the like of a steering shaft, and, based on detection signals of these, controls an operation amount of a steering electric actuator to drive a steering axle.

In the steer-by-wire system, since a correspondence relationship between an operation amount of a steering wheel and a steering amount of a steering electric actuator can be set without being mechanically restricted, a steer-by-wire control device can flexibly cope with a change in a steering characteristic according to a traveling state of a vehicle such as a level of a speed of the vehicle, a length of a turning radius, presence or absence of acceleration or deceleration of the vehicle, and has an advantage that the degree of freedom in design is improved. Furthermore, the steer-by-wire control device has many advantages as compared with a conventional steering control device, such as an advantage of being easily developed into an automatic steering system including lane keeping control.

A reaction force electric actuator for applying a steering reaction force torque to a steering wheel is attached to a steering shaft separated from a steering mechanism. As an appropriate steering reaction force torque is applied to a steering wheel, a driver of a vehicle can perform steering operation with a sense as if the steering wheel and a steering mechanism are mechanically connected.

In a vehicle including this type of steering control device, it is assumed that the steering control device switches between an automatic steering mode (hereinafter, also referred to as "active steering mode" or "automatic driving mode") and a manual steering mode (hereinafter, also referred to as "manual steering mode" or "manual driving mode") during driving. Then, in general, for example, a steering control device is configured to execute the manual steering mode in a case where a driver grips a steering wheel, and execute the active steering mode in a case where the driver does not grip the steering wheel.

In a case where the active steering mode is executed, a steering control device obtains a steering angle of a steered wheel based on an external steering command value from an automatic steering system, and controls a steering electric actuator so as to have the obtained steering angle to drive the steered wheel. In this case, a steering wheel is rotated corresponding to the steering angle of the steered wheel by a reaction force electric actuator, and a rotation angle of the steering wheel and the steering angle of the steered wheel are matched with each other.

Note that examples of automatic steering control of an automatic steering system include lane keeping control for traveling so as not to deviate from a white line laid on a road, automatic driving control for traveling along a traveling route, and the like. In a case of determining that continuation of automatic steering control is difficult during execution of the automatic steering control, an automatic steering system can transfer driving authority to a driver. Further, even when a driver steers a steering wheel to cancel automatic steering control with some intention while the active steering mode is executed, the system needs to promptly detect this and transfer driving authority to the driver.

In these cases, the automatic steering system needs to transfer driving authority to a driver after confirming that the driver grips or steers a steering wheel. For this reason, in a steering control device, detecting that a driver grips a steering wheel (grip detection) and detecting that the driver steers the steering wheel (steering detection) are important problems.

With regard to the grip detection and the steering detection described above, there is known a method of estimating torque (hereinafter, referred to as "driver torque") applied by a driver and detecting gripping and steering of a driver based on a value of the estimated driver torque. The moment of inertia of a steering wheel is used to estimate the driver torque. The moment of inertia of a steering wheel is an important parameter directly linked to estimation accuracy of the driver torque, and is a control parameter that affects behavior of the steering wheel. Such control parameters of a steering wheel include a friction torque, a gravitational torque, and the like in addition to the moment of inertia.

Such a problem of estimating the moment of inertia of a load attached to an actuator is a general problem without limitation to a steer-by-wire control device. A conventional technique for estimating the moment of inertia of a load attached to an actuator is described in PTL 1, for example. In the technique described in PTL 1, in a power assist type mobile body that moves by a force of a motor and a force of a person, the moment of inertia of a load (mobile body such as a carriage) attached to the motor is estimated by estimation of the equivalent moment of inertia of a mobile body using an acceleration of the mobile body detected by an acceleration detection unit and armature current of the motor detected by a current sensor.

CITATION LIST

Patent Literature

PTL 1: JP 2005-153648 A

SUMMARY OF INVENTION

Technical Problem

The technique described in PTL 1 cannot take into consideration that a driver grips a steering wheel, and when the technique described in PTL 1 is used for a steering control device, there is a concern that the moment of inertia of a steering wheel cannot be accurately estimated in a case where a driver grips the steering wheel.

Further, when the moment of inertia of a steering wheel is estimated, the steering wheel needs to be operated by torque of a motor. At this time, when the steering wheel greatly operates independently of a driver's intention, there is a concern that the driver feels uneasy or uncomfortable.

For this reason, a steer-by-wire control device and a control method for a steer-by-wire system (steer-by-wire control method) capable of accurately estimating a control parameter of a steering wheel such as the moment of inertia by a method that hardly gives uneasiness or discomfort to a driver of a vehicle are desired.

An object of the present invention is to provide a steer-by-wire control device and a steer-by-wire control method capable of accurately estimating a control parameter of a steering wheel by a method that hardly gives uneasiness or discomfort to a driver of a vehicle.

Solution to Problem

A steer-by-wire control device according to the present invention includes a first motor that operates a steering wheel of a vehicle, a second motor that controls steering operation of a wheel of the vehicle, and a control device that controls the first motor and the second motor. Before the vehicle makes a transition to an automatic driving mode, the control device applies predetermined input torque to the steering wheel by the first motor in both a forward rotation direction and a backward rotation direction of rotation directions of the first motor. The control device acquires behavior information that is information about behavior of the steering wheel obtained by application of the input torque. The control device determines whether or not to make a transition to a control parameter estimation mode for estimating a control parameter of the steering wheel based on the behavior information. The behavior information includes at least one of a value of a rotation angle of the steering wheel and a value obtained by time-differentiating the rotation angle.

A steer-by-wire control method according to the present invention is executed by a control device that controls a first motor that operates a steering wheel of a vehicle and a second motor that controls steering operation of a wheel of the vehicle. The steer-by-wire control method includes the steps of applying predetermined input torque to the steering wheel by the first motor in both a forward rotation direction and a backward rotation direction of rotation directions of the first motor before the vehicle makes a transition to an automatic driving mode, acquiring behavior information that is information about behavior of the steering wheel obtained by application of the input torque, and determining whether or not to make a transition to a control parameter estimation mode for estimating a control parameter of the steering wheel based on the behavior information. The behavior information includes at least one of a value of a rotation angle of the steering wheel and a value obtained by time-differentiating the rotation angle.

Advantageous Effects of Invention

According to the present invention, it is possible to provide a steer-by-wire control device and a steer-by-wire control method capable of accurately estimating a control parameter of a steering wheel by a method that hardly gives uneasiness or discomfort to a driver of a vehicle.

DESCRIPTION OF EMBODIMENTS

Figure 1:
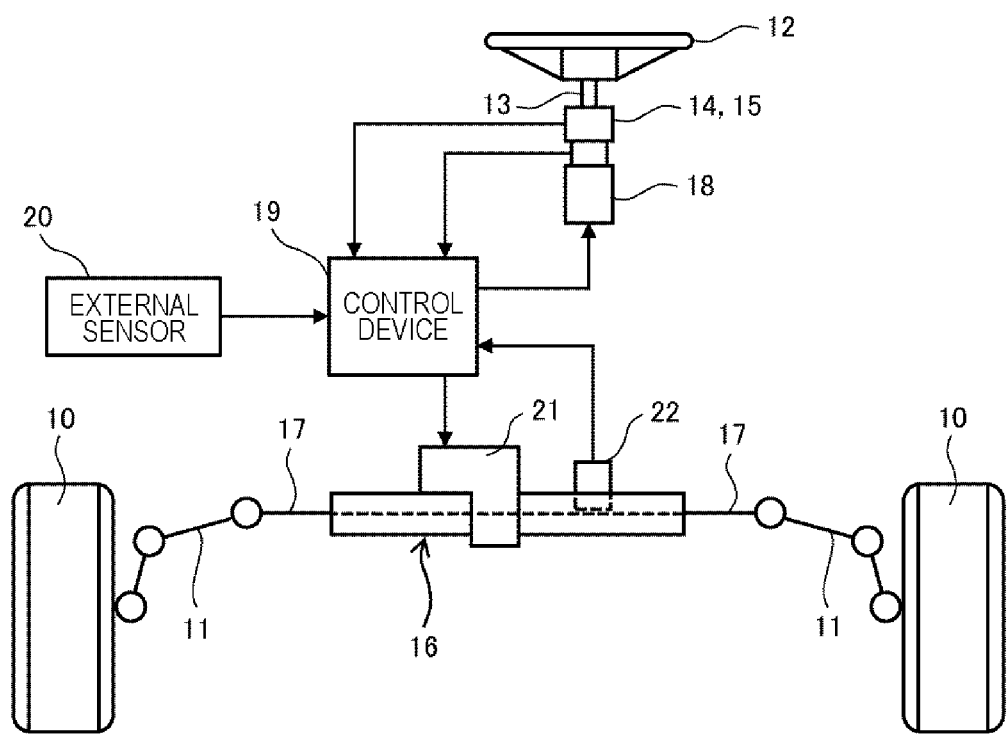
FIG. 1 is a diagram illustrating a configuration of a steer-by-wire control device according to a first embodiment of the present invention.

A steer-by-wire control device according to the present invention is a steering control device mounted on a vehicle, and includes, for example, a configuration described in the claims. A steer-by-wire control method according to the present invention is executed by a steering control device mounted on a vehicle, and includes, for example, a configuration described in the claims.

For example, the steer-by-wire control device according to the present invention applies predetermined input torque to a steering wheel by a first motor (for example, a reaction force electric motor) that operates the steering wheel in both a forward rotation direction and a backward rotation direction of rotation directions of the first motor before a vehicle makes a transition to the automatic driving mode, acquires behavior information of the steering wheel obtained by the application, and determines whether or not to estimate a control parameter (for example, the moment of inertia) of the steering wheel on the basis of the behavior information.

By making such a determination based on the behavior information of the steering wheel, the moment of inertia of the steering wheel can be estimated in a state where a driver of the vehicle releases his/her hands from the steering wheel, that is, in a state where the driver torque is zero, and the moment of inertia can be accurately estimated.

Further, as input torque is applied to the steering wheel in both the forward rotation direction and the backward rotation direction of the rotation directions of the first motor, it is possible to generate the same degree of change in acceleration by smaller rotation operation of the steering wheel as compared with a case where input torque is applied only in one direction, and it is possible to accurately detect a change in the moment of inertia while reducing discomfort of the driver. Furthermore, as input torque is applied in both the forward rotation direction and the backward rotation direction in the rotation direction of the first motor, the steering wheel can be returned to a neutral point after rotation operation, and it is possible to prevent the driver from feeling uneasy due to a position of the steering wheel deviating from the neutral point.

The steer-by-wire control device and the steer-by-wire control method according to the present invention can accurately estimate a control parameter of a steering wheel by a method that hardly gives uneasiness and discomfort to a driver of a vehicle by the above control, and can realize the grip detection and the steering detection of the steering wheel with high accuracy.

Hereinafter, the steer-by-wire control device and the steer-by-wire control method according to an embodiment of the present invention will be described in detail with reference to the drawings.

In an embodiment below, the moment of inertia will be mainly described as a control parameter that affects behavior of a steering wheel. Control parameters of a steering wheel include a friction torque and a gravitational torque, and the friction torque and the gravitational torque will be described in a second embodiment.

Note that the present invention is not limited to an embodiment below, and various variations and applications within a technical concept of the present invention are also included in the scope of the present invention.

First Embodiment

Before description of a specific embodiment of the present invention, a general configuration of the steer-by-wire control device will be described with reference to FIGS. 1 and 2. In the steer-by-wire control device described below, with respect to a configuration in which a steering shaft is separated from a steering axle, a rotation angle of the steering shaft, a disturbance torque, a steering angle of a steered wheel, and the like are detected by sensors (for example, a rotation angle sensor, a current sensor, and a rack position sensor), and operation amounts of a steering electric actuator and a reaction force electric actuator are controlled based on a detection signal of the sensors.

FIG. 1 is a diagram illustrating a configuration of the steer-by-wire control device according to a first embodiment of the present invention. The steer-by-wire control device according to the present embodiment includes a control device 19, a reaction force electric motor 18, and a steering electric motor provided in a steering electric motor mechanism 21.

A steered wheel 10 is configured to be steered by a tie rod 11. The tie rod 11 is connected to a steering axle 17 (also referred to as a rack bar) of a steering mechanism 16. The steering mechanism 16 includes the steering axle 17 and the steering electric motor mechanism 21.

A steering wheel 12 is connected to a steering shaft 13. The steering shaft 13 can be provided with a sensor such as a steering operation angle sensor as necessary.

The steering shaft 13 is not connected to the steering axle 17, and includes the reaction force electric motor 18 at a tip of the steering shaft 13. That is, the steering shaft 13 has a configuration not mechanically connected to the steering mechanism 16, and as a result, the steering shaft 13 and the steering mechanism 16 are separated from each other.

The reaction force electric motor 18 is a reaction force electric actuator that is controlled by the control device 19, applies steering reaction force torque to the steering shaft 13, and operates the steering wheel 12. Note that the reaction force electric actuator may be an electric actuator of a type other than an electric motor. Hereinafter, the reaction force electric motor 18 is referred to as the reaction force motor 18.

The reaction force motor 18 includes a rotation angle sensor 14 as a steering operation amount sensor that detects rotation of the steering shaft 13. The rotation angle sensor 14 detects a rotation angle of the reaction force motor 18, that is, a rotation angle of the steering wheel 12. The steering operation amount sensor does not need to be the rotation angle sensor 14, and may be an optional sensor capable of detecting rotation of the steering shaft 13. For example, the steering operation amount sensor may be a steering operation angle sensor that detects a steering operation angle of the steering shaft 13.

Further, the reaction force motor 18 includes a current sensor 15 which is a steering operation amount sensor. The current sensor 15 detects current flowing through a coil of the reaction force motor 18. This current can be used, for example, in a case of estimating a disturbance torque (for example, torque applied to the steering wheel 12 during traveling of a vehicle) or in a case of determining whether or not a driver of a vehicle grips the steering wheel 12.

The steering mechanism 16 including the steering axle 17 is provided with the steering electric motor mechanism 21. The steering electric motor mechanism 21 controls steering operation of the steering axle 17. Note that, in the present embodiment, the steering mechanism 16 includes the steering electric motor mechanism 21 since an electric motor (a steering electric motor 35 to be described later) is used as a steering electric actuator, but the steering electric actuator may be an electric actuator of a type other than an electric motor.

The control device 19 controls the reaction force motor 18 and the steering electric motor mechanism 21 of the steering mechanism 16. The control device 19 receives input of a signal regarding a rotation angle of the steering wheel 12 detected by the rotation angle sensor 14 and a signal regarding current flowing through a coil of the reaction force motor 18 detected by the current sensor 15. Note that, in addition to these detection signals, the control device 19 receives input of various detection signals from an external sensor 20.

The control device 19 calculates a control amount of the steering electric motor mechanism 21 based on information on an input rotation angle and current, and controls the steering electric motor mechanism 21. Note that the control amount of the steering electric motor mechanism 21 can also be obtained based on a parameter other than a rotation angle and current.

Although described in detail later, the steering electric motor mechanism 21 rotates an output pulley of the steering mechanism 16 from an input pulley via a belt, and further causes the steering axle 17 to perform stroke operation in an axial direction by a steering nut to steer the steered wheel 10.

The control device 19 calculates a control amount of the reaction force motor 18 based on information on an input rotation angle and current, rack position information detected by a rack position sensor 22, and the like, and controls the reaction force motor 18. The rack position sensor 22 detects a movement amount of the steering axle 17 from a reference position (neutral position). The movement amount of the steering axle 17 is information equivalent to a steering angle (steering amount) of the steered wheel 10. Note that a control amount of the reaction force motor 18 can also be obtained based on a parameter other than information on a rotation angle and current, and a rack position information.

Although illustrated as one functional block in FIG. 1, the control device 19 includes a reaction force actuator control device and a steering actuator control device. The reaction force actuator control device and the steering actuator control device are connected to each other by a communication line. The reaction force actuator control device is provided in the reaction force motor 18 and controls a reaction force electric actuator (the reaction force motor 18). The steering actuator control device is provided in the steering electric motor mechanism 21 and controls a steering electric actuator (the steering electric motor 35 to be described later). Note that the reaction force actuator control device and the steering actuator control device can be configured by one of the control device 19, and the reaction force electric actuator and the steering electric actuator can be controlled by one of the control device 19.

The steering mechanism 16 includes the rack position sensor 22 as a steering amount sensor that detects a steering amount of the steered wheel 10. The rack position sensor 22 detects a stroke amount in the axial direction of the steering axle 17, and detects and outputs an actual steering amount (steering angle) of the steered wheel 10. The steering amount sensor does not need to be the rack position sensor 22, but may be an optional sensor capable of detecting a position (steering amount) of the steering axle 17. For example, the steering amount sensor may be a rotation angle sensor provided in the steering electric motor mechanism 21 that applies a steering force to the steering axle 17.

Note that the steering mechanism 16 includes the steering axle 17, the steering electric motor mechanism 21, a speed reduction mechanism, and the like, but a mechanism that transmits a steering force from the steering electric motor mechanism 21 to the steered wheel 10 is not limited to these.

Figure 2:
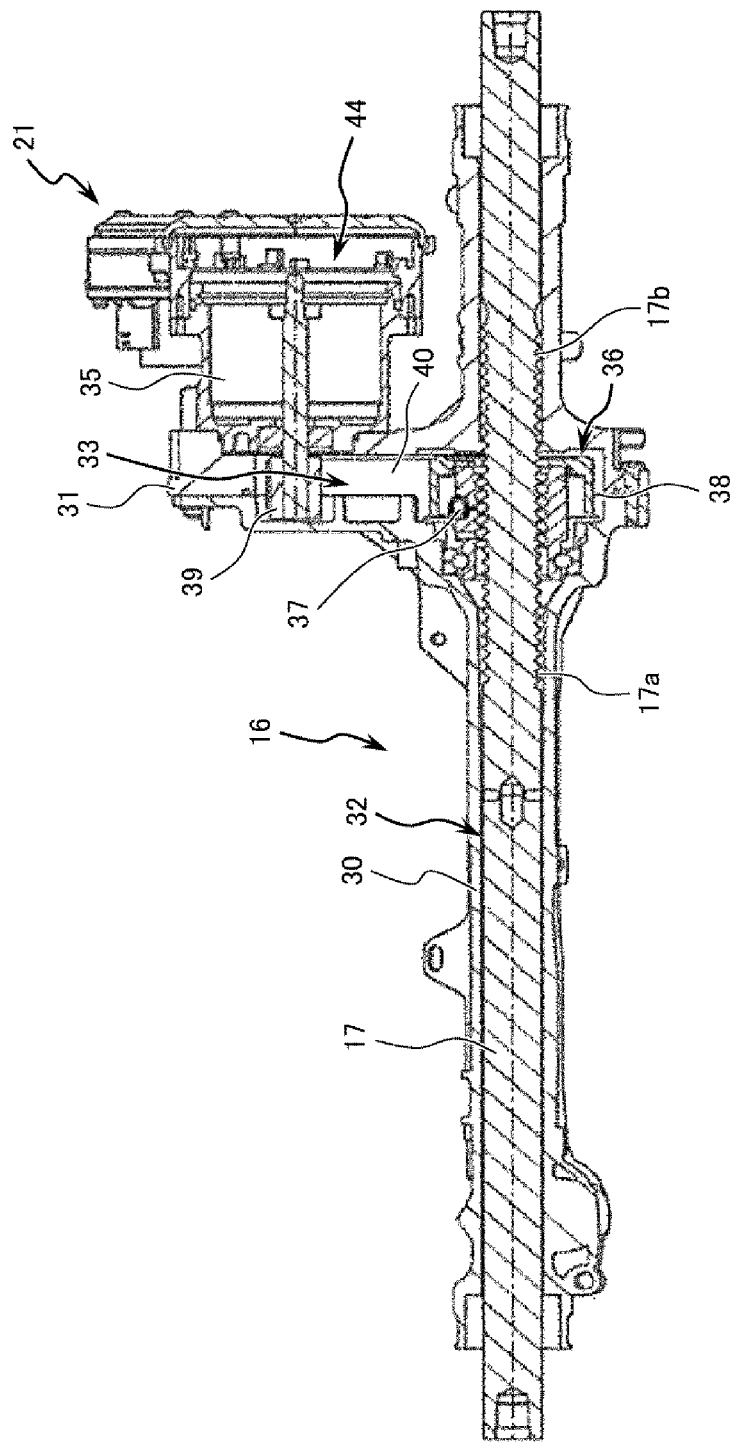
FIG. 2 is a diagram illustrating a cross section along an axial direction of a steering mechanism.

FIG. 2 is a diagram illustrating a cross section along an axial direction of the steering mechanism 16. A configuration of the steering mechanism 16 will be described with reference to FIG. 2.

Each constituent of the steering mechanism 16 is housed in a housing 32 except for the steering electric motor mechanism 21. The housing 32 includes a steering axle accommodation portion 30 that houses the steering axle 17 so as to be movable in the axial direction, and a speed reducer accommodation portion 31 that is arranged in an intermediate portion in the axial direction of the steering axle accommodation portion 30 and is formed to surround the steering axle 17. A speed reduction mechanism 33 is housed in the speed reducer accommodation portion 31.

The steering electric motor mechanism 21 includes the steering electric motor 35, a steering actuator control device 44 that controls the steering electric motor 35, and a screw mechanism 36 that transmits output of the steering electric motor 35 to the steering axle 17. The steering electric motor 35 is controlled by the control device 19 and controls steering operation of the steered wheel 10 of a vehicle. The steering actuator control device 44 controls a rotation amount, a rotation speed, and the like of the steering electric motor 35 according to a steering operation amount applied to the steering wheel 12 by a driver. Hereinafter, the steering electric motor 35 is referred to as the steering motor 35.

The screw mechanism 36 includes a steering nut 37 and an output pulley 38. The output pulley 38 is a cylindrical member, is fixed to the steering nut 37, and rotates integrally with the steering nut 37. A cylindrical input pulley 39 is fixed to a drive shaft of the steering motor 35. The input pulley 39 rotates integrally with a drive shaft of the steering motor 35. A belt 40 is wound between the output pulley 38 and the input pulley 39. The speed reduction mechanism 33 includes the input pulley 39, the output pulley 38, and the belt 40.

The steering nut 37 has an annular shape surrounding the steering axle 17 and is provided to be rotatable with respect to the steering axle 17. The steering nut 37 includes a spiral groove on its inner peripheral portion, and this groove constitutes a nut side ball screw groove. The steering axle 17 includes a spiral groove on its outer peripheral portion, and this groove constitutes steering axle side ball screw grooves 17a and 17b.

In a state where the steering nut 37 is inserted into the steering axle 17, the nut side ball screw groove and the steering axle side ball screw grooves 17a and 17b constitute a ball circulation groove. The inside of the ball circulation groove is filled with a plurality of metal balls, and when the steering nut 37 rotates, the balls move inside the ball circulation groove, so that the steering axle 17 moves in the axial direction (longitudinal direction) with respect to the steering nut 37, and the steering axle 17 performs stroke operation.

The steering the above-described mechanism 16 has configuration, and the steering actuator control device 44 controls a rotation amount, a rotation direction, a rotation speed, and the like of the steering motor 35 to operate the steering axle 17 in accordance with steering operation of the steering wheel 12, so that a vehicle is operated.

Note that, although FIG. 2 illustrates the steering mechanism 16 mounted on a front wheel of a vehicle, the steering mechanism 16 can also be mounted on a rear wheel of a vehicle. Therefore, not only a front wheel but also a rear wheel of a vehicle can be steered by the steering motor 35.

Figure 3:
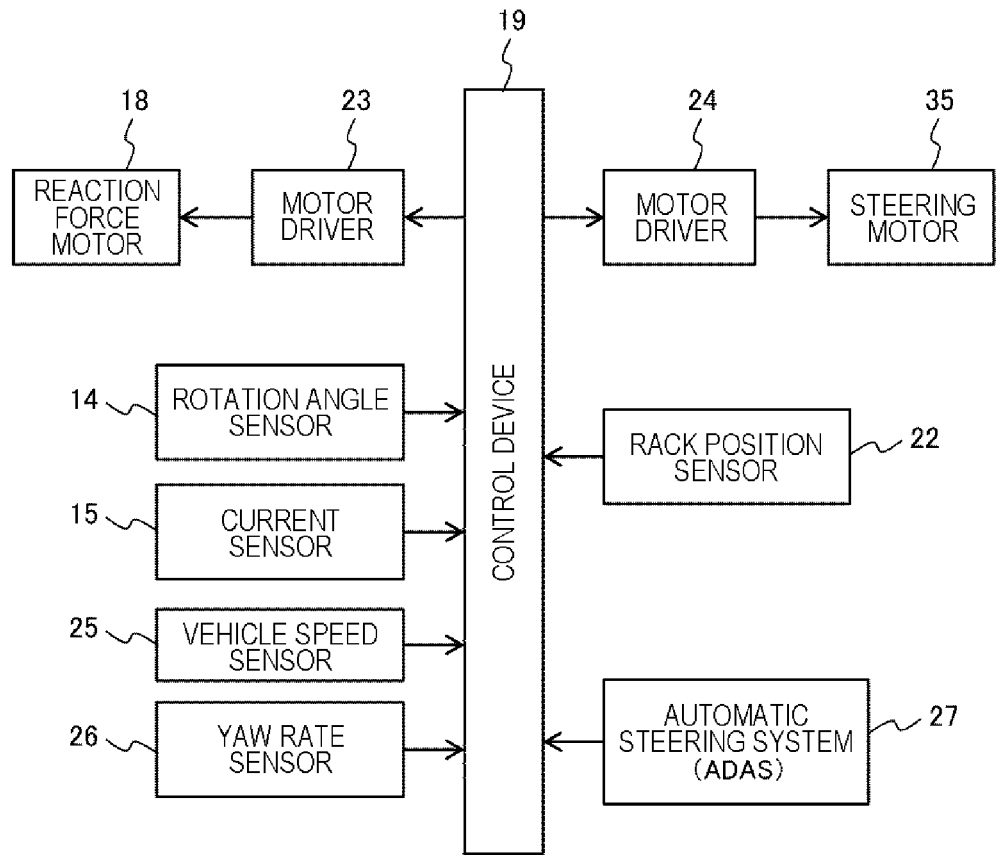
FIG. 3 is a diagram illustrating an outline of a configuration in which a control device controls a reaction force motor and a steering motor.

FIG. 3 is a diagram illustrating an outline of a configuration in which the control device 19 illustrated in FIG. 1 controls the reaction force motor 18 and the steering motor 35. As described above, the control device 19 includes a reaction force actuator control device provided in the reaction force motor 18 and the steering actuator control device 44. For the control device 19 illustrated in FIG. 3, both the reaction force actuator control device and the steering actuator control device 44 are illustrated.

The reaction force motor 18 connected to the steering shaft 13 is provided with the rotation angle sensor 14 and the current sensor 15. The reaction force motor 18 is mechanically connected to the steering wheel 12. The rotation angle sensor 14 is a sensor that detects a rotation angle of the reaction force motor 18, in other words, a rotation angle of the steering wheel 12. The current sensor 15 is a sensor that detects current flowing through a coil of the reaction force motor 18.

The control device 19 can identify a state in which a driver grips the steering wheel 12 and a state in which the driver does not grip the steering wheel 12 from information on a rotation angle of the steering wheel 12 obtained by the rotation angle sensor 14 and information on torque of the reaction force motor 18.

Note that the control device 19 can also use information from the current sensor 15 to identify a state in which a driver grips the steering wheel 12 and a state in which the driver does not grip the steering wheel 12. For example, the control device 19 can detect a vibration component of current and determine whether or not a driver grips the steering wheel 12 from a change in a peak of the vibration component. As described above, a sensor suitable for the system can be used as a sensor that identifies a state in which a driver grips the steering wheel 12 and a state in which the driver does not grip the steering wheel 12.

The reaction force motor 18 is an electric motor that applies a steering reaction force torque to the steering shaft 13, and is controlled by the control device 19 via a motor driver 23. The steering motor 35 is an electric motor that operates the steering axle 17, and is controlled by the control device 19 via a motor driver 24.

The control device 19 receives input of information from the rack position sensor 22 and the rotation angle sensor 14, and controls the reaction force motor 18 based on the input information, so as to apply a steering reaction force torque to the steering shaft 13 to rotate the steering wheel 12. Further, the control device 19 drives the steering axle 17 mechanically connected to the steering motor 35 by controlling the steering motor 35 on the basis of information input from the rotation angle sensor 14 and the current sensor 15 and information on an external steering command value.

The control device 19 receives input of information on a rotation angle of the reaction force motor 18 from the rotation angle sensor 14, and receives input of information on current flowing through a coil of the reaction force motor 18 from the current sensor 15. Furthermore, the control device 19 receives input of information on a travel state of a vehicle that affects steering from a travel state sensor such as a vehicle speed sensor 25 and a yaw rate sensor 26. Further, the control device 19 receives input of information on a movement position of the steering axle 17 from the rack position sensor 22. The control device 19 can derive a steering amount (steering angle) of the steered wheel 10 from the movement position of the steering axle 17.

The rack position sensor 22 is attached to a portion of the housing 32 covering the steering axle 17 (See FIGS. 1 and 2), and can detect a position of the steering axle 17. The steering axle 17 is directly connected to the tie rod 11. For this reason, the control device 19 can detect a steering angle of the steered wheel 10 based on position information of the rack position sensor 22. As described above, the rack position sensor 22 functions as a detector that detects a steering angle of the steered wheel 10.

Further, the control device 19 receives input of an external steering command value from an automatic steering system 27 (for example, an advanced driver assistance system, ADAS) as an external steering control means. The external steering command value is a command value calculated and derived by the automatic steering system 27, and is external steering command information. The external steering command value is a command value for causing the steering mechanism 16 to steer a steered wheel, for example, in a case where a vehicle deviates from a white line on a road by lane keeping control, a case of avoiding an obstacle, or the like.

The steer-by-wire control device according to the present embodiment includes the above configuration, and the control device 19 estimates the driver torque in order to detect that a driver grips the steering wheel 12. In order to estimate the driver torque, it is necessary to obtain an inertia torque of the steering wheel 12, and in order to obtain the inertia torque, it is necessary to obtain the moment of inertia of the steering wheel 12. Hereinafter, an example of a method in which the steer-by-wire control device according to the present embodiment estimates and obtains the moment of inertia of the steering wheel 12 will be described. As described above, the moment of inertia is a control parameter that affects behavior of a steering wheel.

Figure 4:
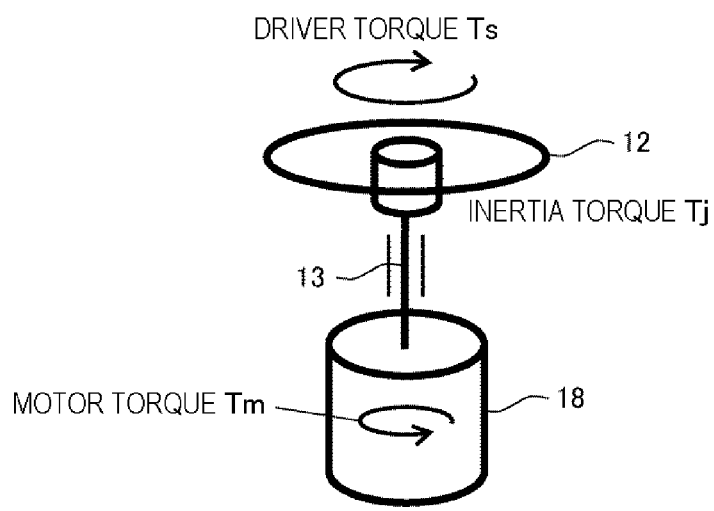
FIG. 4 is a diagram illustrating balance of torque around a steering wheel in the first embodiment.

FIG. 4 is a diagram illustrating balance of torque around the steering wheel 12. FIG. 4 illustrates driver torque Ts, motor torque Tm, and inertia torque Tj. The driver torque Ts is torque applied by a driver. The motor torque Tm is torque generated by the reaction force motor 18. The inertia torque Tj is torque generated by the moment of inertia of the steering wheel 12 (that is, the moment of inertia of the steering wheel 12 and a portion that rotates in conjunction with the steering wheel 12). When estimating the driver torque Ts, balance of torque illustrated in FIG. 4 is considered.

Hereinafter, as an example, as illustrated in FIG. 4, a case in which the driver torque Ts is applied clockwise as viewed from an upper direction of the paper surface, and the motor torque Tm is applied counterclockwise as viewed from the upper direction of the paper surface so as to oppose the driver torque Ts will be described.

As illustrated in FIG. 4, balance between the driver torque Ts, the motor torque Tm, and the inertial torque Tj is expressed by Equation (1).

$$Ts = Tn - Tj \qquad (1)$$

The motor torque Tm can be obtained from information on current of the current sensor 15. The inertial torque Tj can be obtained from information on a rotation angle of the rotation angle sensor 14. Specifically, the motor torque Tm is obtained by multiplying a current value detected by the current sensor 15 by a torque constant of the reaction force motor 18. The inertia torque Tj is obtained by time-differentiating a rotation angle detected by the rotation angle sensor 14 twice to obtain a rotation angular acceleration, and multiplying the rotation angular acceleration by the moment of inertia of the steering wheel 12. The driver torque Ts can be estimated by substitution of the motor torque Tm and the inertial torque Tj thus obtained into Equation (1).

When estimating the driver torque Ts, it is necessary to pay attention to a point below. For example, in a case where an accessory such as a cover is attached to the steering wheel 12 or in a case where the steering wheel 12 is replaced, a value of the actual moment of inertia of the steering wheel 12 is different from a value of the moment of inertia at a design value. For this reason, a value of the inertia torque Tj obtained from the moment of inertia at a design value may be different from an actual value of the inertia torque Tj. In such a case, there is a concern that an estimation error of the driver torque Ts increases. For this reason, in order to accurately estimate the driver torque Ts, it is necessary to accurately estimate the actual moment of inertia of the steering wheel 12.

In the steer-by-wire control device according to the present embodiment, the control device 19 applies a reference torque to the steering wheel 12 by the reaction force motor 18, and detects a change in the moment of inertia from behavior of the steering wheel 12 obtained with respect to the reference torque. The reference torque is a predetermined input torque, and changes according to a waveform determined optionally in advance. The reference torque can be optionally determined, and is preferably large enough to allow detection of a change in the moment of inertia of the steering wheel 12.

In order to detect a change in the moment of inertia from behavior of the steering wheel 12 obtained by application of the reference torque, it is necessary to create a state in which the motor torque Tm and the inertia torque Tj are balanced as shown in Equation (2).

$$Tm = Tj \qquad (2)$$

Equation (2) indicates a state where the driver torque Ts is zero from Equation (1), that is, a state where a driver does not touch the steering wheel 12. When a change in the moment of inertia is detected by application of the reference torque in the state shown in Equation (2), the moment of inertia can be prevented from changing due to influence of a driver. Therefore, the reference torque needs to be applied in a state where the driver torque Ts is zero.

Further, it is necessary to estimate the moment of inertia of the steering wheel 12 always before a vehicle makes a transition to the automatic driving mode for automatic driving. When the driver torque Ts is estimated based on a value of the moment of inertia at a design value although a value of the actual moment of inertia is different from a value of the moment of inertia at a design value, the estimated driver torque Ts is different from an actual value and includes an error. Then, due to this error, when the automatic steering system 27 erroneously recognizes whether or not a driver grips the steering wheel 12, a vehicle may fall into a dangerous state.

Figure 5:
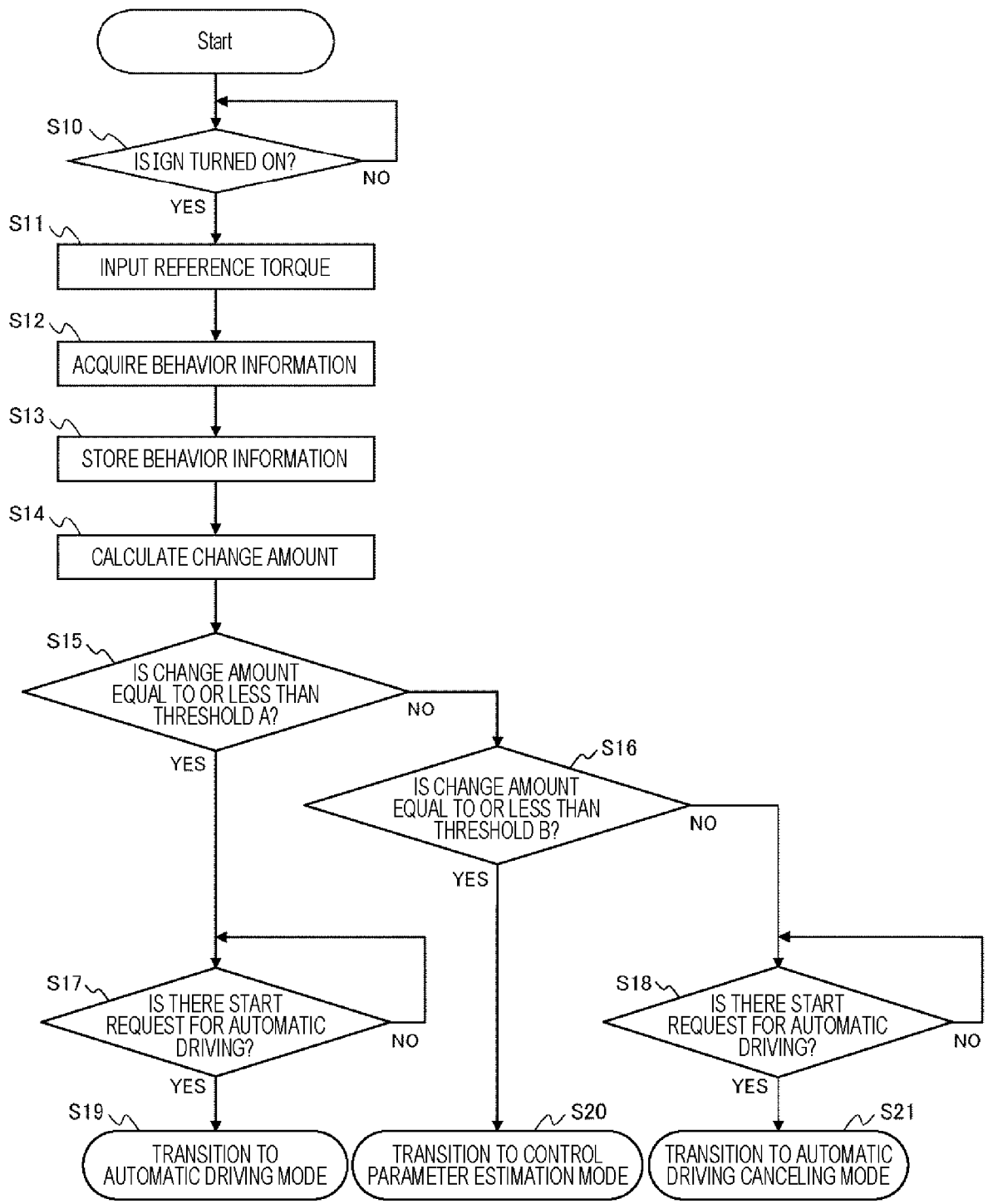
FIG. 5 is a diagram illustrating a flowchart of processing in which the control device detects a change in the moment of inertia of the steering wheel.

In order to prevent this, in the steer-by-wire control device according to the present embodiment, the control device 19 executes processing illustrated in a flowchart of FIG. 5 in order to check whether or not there is a change in the moment of inertia of the steering wheel 12 before a vehicle makes a transition to the automatic driving mode.

FIG. 5 is diagram illustrating a flowchart of processing in which the control device 19 detects a change in the moment of inertia of the steering wheel 12. FIG. 5 illustrates, as an example, a flowchart of processing in which the control device 19 detects a change in the moment of inertia triggered by turning on of an activation switch (hereinafter, referred to as "IGN") of a vehicle. Note that the control device 19 may use a thing other than turning on of the IGN as a trigger as long as the processing of detecting a change in the moment of inertia is performed before transition to the automatic driving mode. For example, unlocking of a vehicle or sensing approach of a driver to a vehicle can be used as a trigger.

In S10, the control device 19 determines whether or not a signal indicating that the IGN is turned on is input. In a case where the IGN is turned on, processing of S11 is executed.

In S11, the control device 19 applies the reference torque (input torque) to the steering wheel 12 by the reaction force motor 18. As described later, the control device 19 determines to which mode (S19 to S21) a transition is to be made based on information about behavior of the steering wheel 12 obtained by application of the reference torque.

In S12, the control device 19 acquires information (behavior information) about behavior of the steering wheel 12 obtained by application of the reference torque. The behavior information includes, for example, at least one of a value of a rotation angle of the steering wheel 12, and a value of angular velocity, a value of angular acceleration, and a value of angular jerk of the steering wheel 12 obtained by time-differentiating the rotation angle.

In S13, the control device 19 stores the behavior information acquired in S12. Note that the control device 19 stores a design value or a measured value after manufacturing as an initial value of the behavior information.

In S14, the control device 19 calculates and obtains a change amount of the behavior information. The control device 19 compares the behavior information (current behavior information) acquired in S12 with the behavior information (previous behavior information) already stored in S13 when the IGN is turned on last time, and calculates a change amount of the current behavior information from the previous behavior information.

The control device 19 preferably handles a change amount in the behavior information as an absolute value so that both a case where a value of the behavior information increases and a case where a value of the behavior information decreases can be considered. This is because a change amount of the current behavior information n from the previous behavior information includes a positive value (in a case where a value of the behavior information increases) and a negative value (in a case where a value of the behavior information decreases). That is, when an absolute value of a change amount of the behavior information is set as a change amount of the behavior information and a change amount of the behavior information is compared with a threshold in processing described below, the control device 19 preferably compares the magnitude of an absolute value of the change amount of the behavior information with the threshold.

In S15, the control device 19 compares the change amount in the behavior information obtained in step S14 with a predetermined threshold A. The threshold A is a value for determining whether or not the moment of inertia changes. In a case where the change amount is equal to or less than the threshold A, the control device 19 determines that the moment of inertia does not change because the change amount of the moment of inertia is within a predetermined range, and executes processing of S17. In a case where the change amount is larger than the threshold A, the control device 19 executes processing of S16.

In S17, the control device 19 determines whether or not there is a start request for automatic driving (request for switching to automatic driving mode, that is, automatic steering mode) from a driver. In a case where there is a start request for automatic driving from a driver, the control device 19 executes processing of S19.

In S19, the control device 19 makes a transition to the automatic driving mode and causes a vehicle to make a transition to the automatic driving mode. In this case, the control device 19 estimates the driver torque Ts by using a value of the moment of inertia used last time.

Step S16 is processing in a case where a change amount in the behavior information is larger than the threshold A. In S16, the control device 19 compares the change amount in the behavior information obtained in step S14 with a predetermined threshold B. The threshold B is a value larger than the threshold A, and is a value for determining whether or not a driver touches the steering wheel 12 (that is, whether or not Equation (2) is satisfied). In a case where the change amount is equal to or less than the threshold B, a driver does not touch the steering wheel 12 (that is, Equation (2) is satisfied and the driver torque Ts is zero), but the change amount in the moment of inertia exceeds a predetermined range. Therefore, the control device 19 determines that it is necessary to estimate the moment of inertia, and executes processing of S20. In a case where the change amount is larger than the threshold B, the control device 19 executes processing of S18.

In S20, since the change amount in the behavior information is larger than the threshold A and equal to or less than the threshold B, the control device 19 determines that the moment of inertia changes and the driver torque Ts is zero, and makes a transition to a control parameter estimation mode in which a control parameter of a steering wheel is estimated. In the control parameter estimation mode, the control device 19 estimates the moment of inertia of the steering wheel 12 by a method to be described later.

When or after making a transition to the control parameter estimation mode, the control device 19 can notify a driver of the transition to the control parameter estimation mode or instruct the driver to release his/her hands from the steering wheel 12 until the moment of inertia is obtained. The control device 19 can perform such notification and instruction by outputting at least one of video, a character, and voice.

S18 is processing in a case where the change amount in the behavior information is larger than the threshold A and the threshold B. In this case, the control device 19 determines that a driver touches the steering wheel 12 (that is, the driver torque Ts is not zero) or the behavior information is changed due to disturbance. In S18, the control device 19 determines whether or not there is a start request for automatic driving (request for switching to the automatic driving mode) from a driver. In a case where there is a start request for automatic driving from the driver, the control device 19 executes processing of S21.

In S21, the control device 19 makes a transition to an automatic driving canceling mode, and cancels the start request for automatic driving from the driver. In this case, since the driver manually drives in the manual driving mode, the control device 19 does not need to estimate the moment of inertia.

When or after making a transition to the automatic driving canceling mode, the control device 19 can notify a driver that automatic driving is not possible or instruct the driver to release his/her hands from the steering wheel 12. The control device 19 can perform such notification and instruction by outputting at least one of video, a character, and voice.

Further, the control device 19 may re-execute the processing from S11 after executing the processing of S21.

In a case where a change amount of the moment of inertia of the steering wheel 12 exceeds a predetermined range, a value of the moment of inertia is different from a value at a design value, and the driver torque Ts is zero by execution of the processing illustrated in the flowchart of FIG. 5, the control device 19 estimates the moment of inertia by a method described later, so that the driver torque Ts can accurately be estimated. Further, in a case where a change in the moment of inertia cannot be accurately detected, for example, in a case where a driver touches the steering wheel 12, the control device 19 cancels a start request for automatic driving from the driver, and can avoid a vehicle from falling into a dangerous state due to erroneous recognition that the driver grips the steering wheel 12. For this reason, in the steer-by-wire control device according to the present embodiment, it is possible to safely make a transition to automatic driving when making a transition to automatic driving.

Figure 6A:
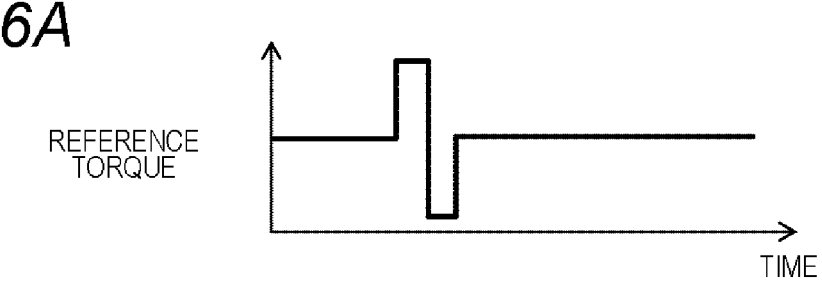
FIG. 6A is a diagram illustrating an example of a waveform of a reference torque (input torque).
Figure 6B:
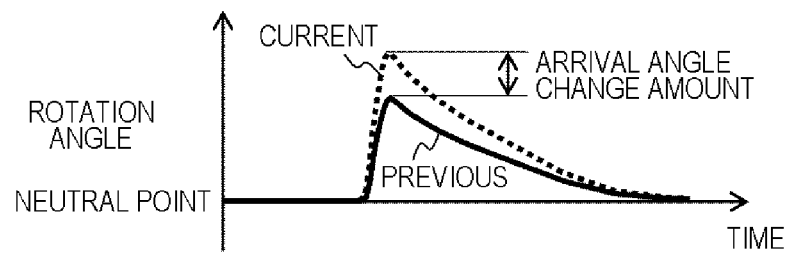
FIG. 6B is a diagram illustrating an example of a rotation angle of the steering wheel obtained by application of the reference torque illustrated in FIG. 6A.
Figure 6C:
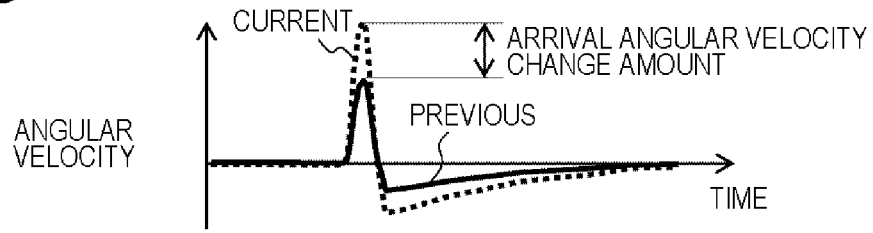
FIG. 6C is a diagram illustrating an example of an angular velocity of the steering wheel obtained by application of the reference torque illustrated in FIG. 6A.

FIGS. 6A to 6C are diagrams for explaining a method of calculating a change amount of information (behavior information) about the behavior of the steering wheel 12 obtained by application of the reference torque. The method of calculating a change amount of the behavior information in S14 of FIG. 5 will be specifically described with reference to FIGS. 6A to 6C.

FIG. 6A illustrates an example of a waveform of the reference torque (input torque). FIG. 6A illustrates, as an example, the reference torque having an impulse waveform. FIG. 6B illustrates an example of a rotation angle of the steering wheel 12 obtained by application of the reference torque illustrated in FIG. 6A. FIG. 6C illustrates an example of an angular velocity of the steering wheel 12 obtained by application of the reference torque illustrated in FIG. 6A. In FIG. 6B, the previous behavior information (rotation angle) is indicated by a solid line, the current behavior information (rotation angle) is indicated by a dotted line, and an arrival angle change amount that is a difference between peak values (arrival angles) of the previous and current rotation angles is indicated as a change amount in the behavior information. In FIG. 6C, the previous behavior information (angular velocity) is indicated by a solid line, the current behavior information (angular velocity) is indicated by a dotted line, and an arrival angular velocity change amount that is a difference between peak values (arrival angular velocities) of the previous and current angular velocities is indicated as a change amount in the behavior information.

For example, in a case where the steering wheel 12 is replaced with the steering wheel 12 having a smaller moment of inertia than that of when the behavior information is acquired last time, it is considered that an arrival angle and an arrival angular velocity increase in the current behavior information as illustrated in FIGS. 6B and 6C. In view of the above, when calculating a change amount in the behavior information in S14 of FIG. 5, the control device 19 calculates an arrival angle change amount and an arrival angular velocity change amount. Then, the control device 19 compares the calculated change amount with the threshold A in S15, and compares the calculated change amount with the threshold B in S16.

The control device 19 applies the reference torque (input torque) having an impulse waveform in both the forward rotation direction and the backward rotation direction of the reaction force motor 18. As illustrated in FIG. 6A, the torque having an impulse waveform is torque represented by a rectangular waveform having a positive value and a negative value. When the reference torque is in the form of an impulse, there is an advantage that a position of the rotated steering wheel 12 can be returned to a neutral point by a torque of a positive value (a forward rotation direction of rotation directions of the reaction force motor 18) and a torque of a negative value (a backward rotation direction of rotation directions of the reaction force motor 18), and a torque that rapidly changes can be applied by a rectangular waveform.

By applying torque that rapidly changes as the reference torque in both the forward rotation direction and the backward rotation direction of the rotation directions of the reaction force motor 18, the control device 19 can generate a similar change in acceleration by a small rotation operation of the steering wheel 12 as compared with a case where torque is applied only in one direction. For this reason, the control device 19 can accurately detect a change in the moment of inertia while reducing driver's discomfort. Furthermore, the control device 19 can return the steering wheel 12 to a neutral point after rotation operation by applying the reference torque in the forward rotation direction and the backward rotation direction of the rotation directions of the reaction force motor 18. For this reason, the control device 19 can prevent a driver from feeling uneasy due to deviation of a position of the steering wheel 12 from a neutral point.

FIGS. 6B and 6C illustrate a rotation angle and an angular velocity as an example of the behavior information for detecting a change in the moment of inertia. As the behavior information, an angular acceleration obtained by time-differentiating an angular velocity or an angular jerk obtained by time-differentiating an angular acceleration may be used.

Figure 7A:
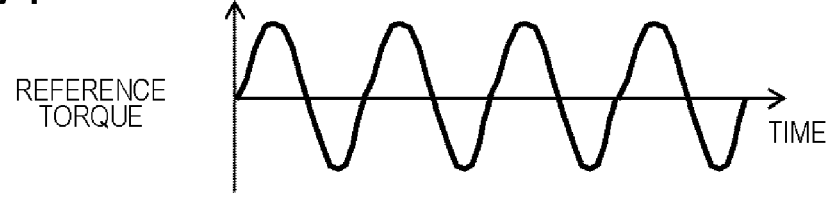
FIG. 7A is a diagram illustrating an example of a waveform of a reference torque (input torque) in a control parameter estimation mode.
Figure 7B:
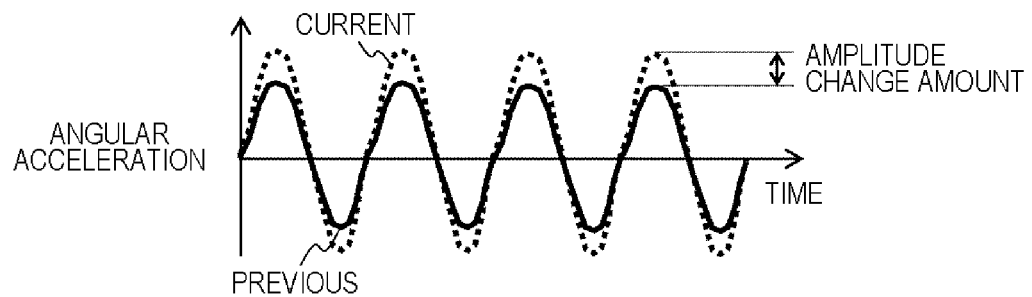
FIG. 7B is a diagram illustrating an example of angular acceleration of the steering wheel obtained by application of the reference torque illustrated in FIG. 7A.

FIGS. 7A and 7B are diagrams for explaining a method of estimating the moment of inertia of the steering wheel 12. A method of estimating the moment of inertia of steering wheel 12 in the control parameter estimation mode in S20 in FIG. 5 will specifically be described with reference to FIGS. 7A and 7B.

In the control parameter estimation mode, the control device 19 estimates the moment of inertia of the steering wheel 12 by applying the reference torque (input torque) to the steering wheel 12 by the reaction force motor 18 and calculating and obtaining a change amount in the behavior information of the steering wheel 12, similarly to the processing illustrated in S11 to S14 of FIG. 5. The control device 19 stores the estimated moment of inertia.

FIG. 7A illustrates an example of a waveform of the reference torque (input torque) in the control parameter estimation mode. FIG. 7A illustrates, as an example, the reference torque having a sinusoidal waveform. FIG. 7B illustrates an example of an angular acceleration of the steering wheel 12 obtained by application of the reference torque illustrated in FIG. 7A. In FIG. 7B, the previous behavior information (angular acceleration) is indicated by a solid line, the current behavior information (angular acceleration) is indicated by a dotted line, and an amplitude change amount which is a difference between peak values of the previous and current angular accelerations is indicated as a change amount in the behavior information.

First, the control device 19 applies the reference torque to the steering wheel 12 by the reaction force motor 18. In the control parameter estimation mode, the control device 19 applies the reference torque having a sinusoidal waveform as illustrated in FIG. 7A, for example. When a waveform of the reference torque is sinusoidal, the steering wheel 12 can be smoothly rotated, and discomfort can be prevented from being given to a driver.

In the control parameter estimation mode, the control device 19 preferably applies, to the steering wheel 12 by the reaction force motor 18, the reference torque with which a value of the behavior information larger than a value of the behavior information of the steering wheel 12 obtained by application of the reference torque in S11 of the processing of detecting a change in the moment of inertia of the steering wheel 12 (FIG. 5) is obtained. When a larger value of the behavior information (for example, a greater change in angular acceleration) is obtained, the control device 19 can estimate the moment of inertia more accurately.

For this reason, when applying the reference torque in the control parameter estimation mode, the control device 19 preferably notifies a driver that the steering wheel 12 operates, and then causes the steering wheel 12 to perform a larger operation than that of when the reference torque (the reference torque having an impulse waveform in the present embodiment) is applied in S11 of FIG. 5. For example, in the control parameter estimation mode, the control device 19 preferably applies the reference torque having a maximum value larger than that of the reference torque applied in S11 of FIG. 5.

Next, the control device 19 acquires the behavior information (angular acceleration in the present embodiment) of the steering wheel 12 obtained by application of the reference torque. Then, the control device 19 obtains a change rate of an amplitude of the current behavior information (angular acceleration) from an amplitude of the previous behavior information (angular acceleration). The control device 19 can estimate the current moment of inertia by multiplying the previous moment of inertia by a reciprocal of the obtained change rate of an amplitude of the behavior information. The control device 19 stores the previous behavior information and the previous moment of inertia. Note that the control device 19 stores a design value or a measured value after manufacture as an initial value of the moment of inertia.

For example, in a case where the steering wheel 12 is replaced with the steering wheel 12 having a smaller moment of inertia than that of when the moment of inertia is previously estimated, it is considered that an amplitude of the angular acceleration increases in the current behavior information as illustrated in FIG. 7B. The inertia torque Tj is obtained by multiplying the angular acceleration by the moment of inertia, and when the driver torque Ts is zero, the inertia torque Tj is balanced with the reference torque (motor torque Tm). Therefore, the control device 19 finds that the moment of inertia is decreased by an amount of increase in an amplitude of the angular acceleration. Then, the control device 19 can estimate the moment of inertia (current moment of inertia) after replacement of the steering wheel 12 by multiplying a reciprocal of a change rate (increase rate in the above description) of the amplitude by the moment of inertia (previous moment of inertia) before replacement of the steering wheel 12.

Note that, in the method of estimating the moment of inertia of the steering wheel 12 in the control parameter estimation mode, a method similar to the processing illustrated in S11 to S14 in the processing of detecting a change in the moment of inertia of the steering wheel 12 illustrated in FIG. 5 (method of calculating and obtaining a change amount in the behavior information by application of the reference torque) is executed. For this reason, the control device 19 can simultaneously perform the processing of S11 to S14 in the processing illustrated in FIG. 5 and the processing of estimating the moment of inertia of the steering wheel 12 in the control parameter estimation mode. When these pieces of processes are performed at the same time, the control device 19 gives even less uneasiness or discomfort to a driver of a vehicle and can quickly estimate the moment of inertia.

However, in order to estimate the moment of inertia more accurately, it is preferable to separately perform the processing from S11 to S14 in the processing illustrated in FIG. 5 and the processing of estimating the moment of inertia of the steering wheel 12 in the control parameter estimation mode, and to apply the reference torque suitable for each piece of the processing (for example, to apply the reference torque of an impulse form and the reference torque of a sinusoidal form).

In the steer-by-wire control device according to the present embodiment, as described above, the control device 19 can accurately estimate the moment of inertia of the steering wheel 12 by a method that hardly gives uneasiness or discomfort to a driver of a vehicle. For this reason, the steer-by-wire control device according to the present embodiment can accurately estimate the driver torque, and can accurately detect that a driver holds the steering wheel 12 and that the driver steers the steering wheel 12.

Second Embodiment

The steer-by-wire control device according to the second embodiment of the present invention will be described. In the steer-by-wire control device according to the present embodiment, the control device 19 can detect a change in rotational friction of the steering shaft 13 and a change in an attachment angle of the steering wheel 12 based on the method for detecting a change in the moment of inertia described in the first embodiment. By detecting these, for example, influence of aging of the steering shaft 13 due to rotational friction and influence of adjustment of an attachment angle of the steering wheel 12 can be known.

Figure 8A:
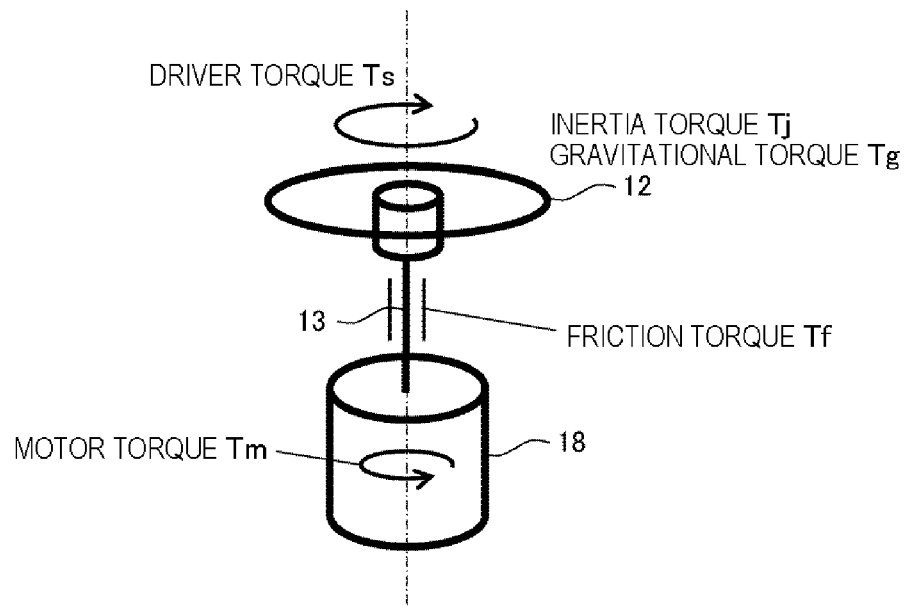
FIG. 8A is a diagram illustrating balance of torque around the steering wheel in a second embodiment.

FIG. 8A is a diagram illustrating the balance of torque around the steering wheel 12 in a case where a friction torque Tf and a gravitational torque Tg are considered in addition to the driver torque Ts, the motor torque Tm, and the inertia torque Tj. The driver torque Ts, the motor torque Tm, and the inertial torque Tj are described in the first embodiment. The friction torque Tf is torque generated in a bearing portion of the steering shaft 13 or the like. The gravitational torque Tg is torque generated by a change in a position of the center of gravity of the steering wheel 12. The friction torque Tf and the gravitational torque Tg are included in control parameters of a steering wheel.

Figure 8B:
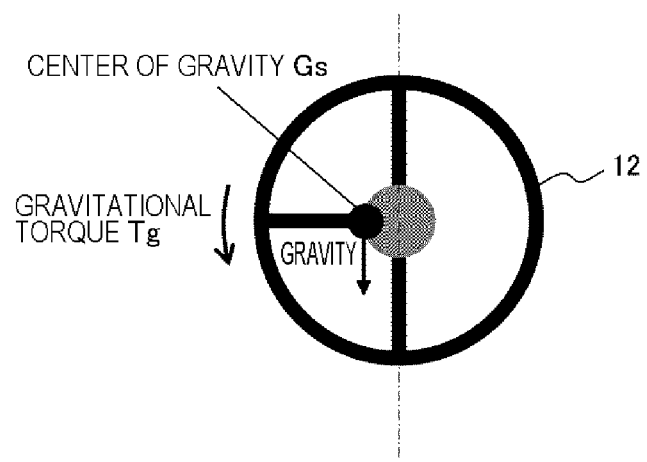
FIG. 8B is a diagram for explaining gravitational torque.

FIG. 8B is a diagram for explaining the gravitational torque Tg. When the steering wheel 12 rotates, a position of the center of gravity Gs of the steering wheel 12 changes, and the gravitational torque Tg is generated. The gravitational torque Tg is generated by gravity acting on the center of gravity Gs of the steering wheel 12, and is considered to change mainly when an attachment angle of the steering wheel 12 in a tilt direction changes.

In the present embodiment, the control device 19 considers the balance of torque illustrated in FIG. 8A when estimating the driver torque Ts. The balance of torque around the steering wheel 12 is expressed by Equation (3).

$$Ts = Tm - Tj - Tf - Tg \quad (3)$$

In the present embodiment, the control device 19 can estimate the driver torque Ts with higher accuracy by considering the friction torque Tf and the gravitational torque Tg.

In a state where a driver does not touch the steering wheel 12, the driver torque Ts is zero, and thus Equation (3) is expressed by Equation (4).

$$Tm = Tj + Tf + Tg \quad (4)$$

That is, in a case where the driver torque Ts is zero, the motor torque Tm is balanced with the sum (Tj+Tf+Tg) of the inertia torque Tj, the friction torque Tf, and the gravitational torque Tg. Therefore, considering what is described in the first embodiment, the control device 19 can detect not only a change in the moment of inertia but also a change in the friction torque Tf and the gravitational torque Tg from behavior of the steering wheel 12 obtained with respect to the reference torque by applying the reference torque (input torque) to the steering wheel 12.

Furthermore, in a case where the control device 19 applies the reference torque that causes the steering wheel 12 to rotate at a constant speed, an angular acceleration of the steering wheel 12 becomes zero, and thus, the inertia torque Tj becomes zero, and the motor torque Tm is balanced with the sum (Tf+Tg) of the friction torque Tf and the gravitational torque Tg as shown in Equation (5).

$$Tm = Tf + Tg \quad (5)$$

Therefore, the control device 19 can detect a change in the friction torque Tf and the gravitational torque Tg from behavior of the steering wheel 12 obtained with respect to the reference torque for rotating the steering wheel 12 at a constant speed, and can obtain a change in rotational friction of the steering shaft 13 and a change in an attachment angle of the steering wheel 12.

In the steer-by-wire control device according to the present embodiment, the control device 19 can accurately detect a change in rotational friction of the steering shaft 13 and a change in an attachment angle of the steering wheel 12 by a method that hardly gives uneasiness or discomfort to a driver of a vehicle. For this reason, the steer-by-wire control device according to the present embodiment can accurately estimate the driver torque, and can accurately detect that a driver holds the steering wheel 12 and that the driver steers the steering wheel 12.

Note that the present invention is not limited to the above embodiment, and various variations are possible. For example, the above embodiment is described in detail for easy understanding of the present invention, and the present invention is not necessarily limited to a mode that includes the entirety of the described configurations. Further, a part of a configuration of one embodiment can be replaced with a configuration of another embodiment. Further, a configuration of an embodiment can be added to a configuration of another embodiment. Further, for a part of a configuration of each embodiment, other configurations can be added or replaced with.

REFERENCE SIGNS LIST

10 steered wheel
11 tie rod
12 steering wheel
13 steering shaft
14 rotation angle sensor
15 current sensor
16 steering mechanism
17 steering axle
17a, 17b steering axle side ball screw groove
18 reaction force electric motor
19 control device
20 external sensor
21 steering electric motor mechanism
22 rack position sensor
23 motor driver
24 motor driver
25 vehicle speed sensor
26 yaw rate sensor
27 automatic steering system
30 steering axle accommodation portion
31 speed reducer accommodation portion
32 housing
33 speed reduction mechanism
35 steering electric motor
36 screw mechanism
37 steering nut
38 output pulley
39 input pulley
40 belt
44 steering actuator control device

The invention claimed is:

1. A steer-by-wire control device comprising:
a first motor that operates a steering wheel of a vehicle;
a second motor that controls steering operation of a wheel of the vehicle; and
a control device that controls the first motor and the second motor,
wherein the control device applies predetermined input torque to the steering wheel by the first motor in both a forward rotation direction and a backward rotation direction of rotation directions of the first motor before the vehicle makes a transition to an automatic driving mode,
the control device acquires behavior information that is information about behavior of the steering wheel obtained by application of the input torque, the control device determines whether or not to make a transition to a control parameter estimation mode for estimating a control parameter of the steering wheel based on the behavior information, and the behavior information includes at least one of a value of a rotation angle of the steering wheel and a value obtained by time-differentiating the rotation angle.

2. The steer-by-wire control device according to claim 1, wherein the control device estimates moment of inertia of the steering wheel based on the behavior information in a case of determining to make a transition to the control parameter estimation mode.

3. The steer-by-wire control device according to claim 1, wherein the input torque has an impulse waveform.

4. The steer-by-wire control device according to claim 1, wherein the input torque has a sinusoidal waveform.

5. The steer-by-wire control device according to claim 1, wherein the control device compares current behavior information that is the behavior information acquired by application of the input torque with previous behavior information that is the behavior information acquired by application of the input torque at a previous time, obtains a change amount of the current behavior information from the previous behavior information, and determines whether or not to make a transition to the control parameter estimation mode based on the change amount.

6. The steer-by-wire control device according to claim 5, wherein the control device determines whether or not to make a transition to the control parameter estimation mode based on an absolute value of the change amount.

7. The steer-by-wire control device according to claim 5, wherein the control device makes a transition to the control parameter estimation mode in a case where the change amount is larger than a predetermined first threshold.

8. The steer-by-wire control device according to claim 7, wherein the control device makes a transition to the control parameter estimation mode in a case where the change amount is equal to or less than a predetermined second threshold.

9. The steer-by-wire control device according to claim 8, wherein the control device causes the vehicle to make a transition to the automatic driving mode in a case where the change amount is equal to or less than the first threshold, and cancels a request for automatic driving from a driver of the vehicle in a case where the change amount is larger than the second threshold.

10. The steer-by-wire control device according to claim 5, wherein the control device estimates moment of inertia of the steering wheel based on the change amount in a case of determining to make a transition to the control parameter estimation mode.

11. A steer-by-wire control method executed by a control device that controls a first motor that operates a steering wheel of a vehicle and a second motor that controls steering operation of a wheel of the vehicle, the steer-by-wire control method comprising the steps of:

applying predetermined input torque to the steering wheel by the first motor in both a forward rotation direction and a backward rotation direction of rotation directions of the first motor before the vehicle makes a transition to an automatic driving mode;

acquiring behavior information that is information about behavior of the steering wheel obtained by application of the input torque; and determining whether or not to make a transition to a control parameter estimation mode for estimating a control parameter of the steering wheel based on the behavior information, wherein the behavior information includes at least one of a value of a rotation angle of the steering wheel and a value obtained by time-differentiating the rotation angle.

* * * * *